United States Patent
Konstantinov

(10) Patent No.: US 12,129,823 B2
(45) Date of Patent: Oct. 29, 2024

(54) FLUID TURBINE WITH PARACHUTE-LIKE CATCHERS

(71) Applicant: Dragomir Konstantinov, Sofia (BG)

(72) Inventor: Dragomir Konstantinov, Sofia (BG)

(*) Notice: Subject to any disclaimer, the term of this patent is extended or adjusted under 35 U.S.C. 154(b) by 0 days.

(21) Appl. No.: 18/549,216

(22) PCT Filed: Jul. 19, 2021

(86) PCT No.: PCT/BG2021/000021
§ 371 (c)(1),
(2) Date: Sep. 6, 2023

(87) PCT Pub. No.: WO2023/000043
PCT Pub. Date: Jan. 26, 2023

(65) Prior Publication Data
US 2024/0151203 A1  May 9, 2024

(51) Int. Cl.
*F03D 3/00* (2006.01)
*F03B 3/04* (2006.01)
(Continued)

(52) U.S. Cl.
CPC ............. *F03B 3/04* (2013.01); *F03B 3/12* (2013.01); *F03B 17/062* (2013.01); *F03D 3/00* (2013.01);
(Continued)

(58) Field of Classification Search
CPC .. F03B 3/04; F03B 3/12; F03B 17/062; F03D 3/00; F03D 3/005; F03D 3/06;
(Continued)

(56) References Cited

U.S. PATENT DOCUMENTS 4,545,729 A * 10/1985 Storm ................. F03D 3/005
416/142
8,210,817 B2 * 7/2012 Iskrenovic ............ F03D 13/20
416/197 A
(Continued)

FOREIGN PATENT DOCUMENTS

GB    2071773 A    9/1981
RU    2453727 C1 * 6/2012
(Continued)

OTHER PUBLICATIONS

International Search Report and Written Opinion; PCT/BG2021/000021; Mailed Nov. 18, 2021.

*Primary Examiner* — Sabbir Hasan
*Assistant Examiner* — Andrew J Marien
(74) *Attorney, Agent, or Firm* — Dunlap Bennett & Ludwig, PLLC

(57) ABSTRACT

The device consists of a vertical axis (1), one or more bearing rings (2), rotor (3), one or more pairs of catchers (4) made of light and strong material, flexible connections (5) and valves (6) with air intakes (7). The device can be applied to capture mechanical pressure and extract energy from fluid flows. Since its catchers are made of flexible and light material, it is characterized by a simple structure, light weight, and easy production and repair. Also, the device has a large working area, and reduces to a negligible small value the aerodynamic resistance during the reversible half-turn of the rotor, which further increases its efficiency.

5 Claims, 1 Drawing Sheet

(51) Int. Cl.
   *F03B 3/12*      (2006.01)
   *F03B 17/06*     (2006.01)
   *F03D 3/06*      (2006.01)

(52) U.S. Cl.
   CPC .............. *F03D 3/005* (2013.01); *F03D 3/06* (2013.01); *F05B 2220/30* (2013.01); *F05B 2240/242* (2013.01); *F05D 2240/30* (2013.01); *F05D 2250/33* (2013.01); *F05D 2300/433* (2013.01)

(58) Field of Classification Search
   CPC ............ F05B 2220/30; F05B 2240/242; F05D 2240/30; F05D 2250/33; F05D 2300/433
   See application file for complete search history.

(56) References Cited

U.S. PATENT DOCUMENTS

| | | | |
|---|---|---|---|
| 9,752,557 B2 * | 9/2017 | Nicklas | F03D 3/068 |
| 11,143,164 B1 * | 10/2021 | Landis | F03D 3/005 |
| 2013/0091861 A1 * | 4/2013 | Groot | F03D 3/067 |
| | | | 416/119 |
| 2013/0115086 A1 | 5/2013 | Hench | |
| 2017/0009736 A1 * | 1/2017 | Behrens | F03D 3/067 |
| 2017/0078554 A1 * | 3/2017 | Suzuki | H04N 23/667 |

FOREIGN PATENT DOCUMENTS

| | | | | |
|---|---|---|---|---|
| SU | 1409772 A1 | | 7/1988 | |
| WO | WO-2007121904 A1 * | 11/2007 | ............. | F03D 3/067 |

\* cited by examiner

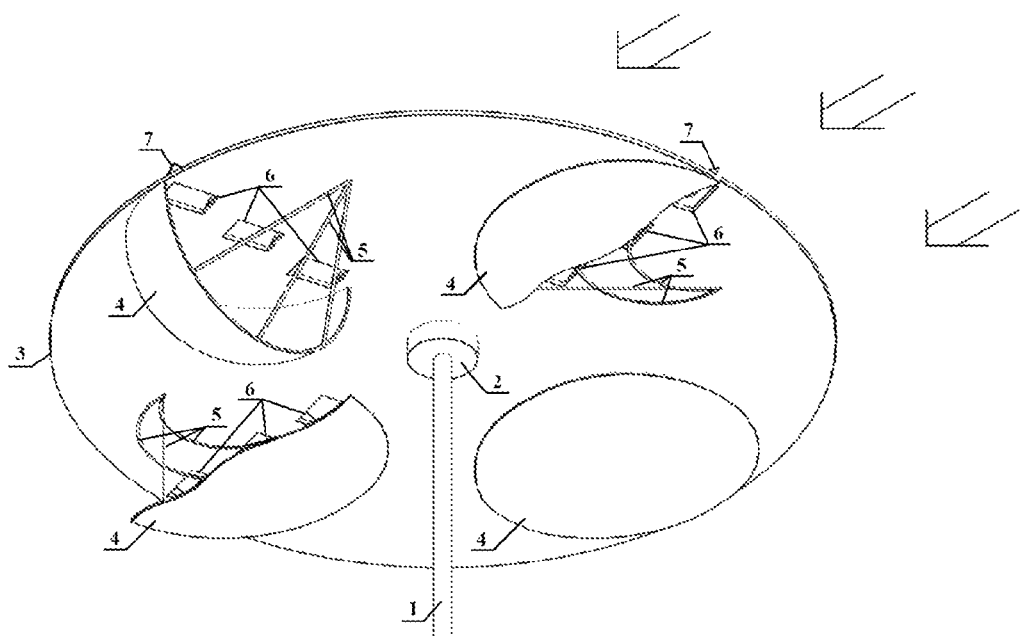

FLUID TURBINE WITH PARACHUTE-LIKE CATCHERS

TECHNICAL FIELD

The fluid turbine with parachute catchers can be used to produce energy from air or water currents.

STATE OF ART

No existing analogues of the proposed device are known. Some vertical axis wind turbines are known that capture the wind with sails, such as that shown in the patent GB 2451089, or with umbrella-like covers such as that shown in patent U.S. Ser. No. 10/385,824. All similar devices use wide support frames and/or support ribs, and succeed only to a limited extent in reducing the experienced pressure against the direction of rotation, which limits their efficiency.

TECHNICAL ESSENCE OF THE INVENTION

The task of the present invention is to provide a turbine with a simple, light and compact construction that allows reset of the tested pressure against the direction of rotation.
The turbine consists of the following elements:
a vertical axis, located in one or several bearing rings, and a rotor in the form of a flat horizontal disk, fixed to the upper end of the axis;
one or more diametrical pairs of catchers are suspended below the rotor, such as the catchers of each pair are centrally symmetrical to each other relative to the axis;
each catcher is made of flexible material and in the passive position has a half-chamber shape that has an opening on one side; the opening of each catcher has a top edge and a side edge;
the upper edge of the opening of each half-chamber is immovably fixed to the rotor, and the side edge of the opening of each half-chamber is clamped to the rotor by two or more flexible links, the first end of each flexible link being attached to the side edge of the catcher opening, and the second end of each flexible link is attached to the rotor;
the openings of all catchers are oriented in the same direction of rotation relative to the axis—either clockwise or counterclockwise;
on the upper side of the rotor, above the opening of each catcher, are located one or more valves with air intakes directed at an angle greater than 45 degrees, relative to the radius of the rotor passing through them;
the valves are in their open position and are directed to the interior of the catchers;
in one embodiment, the catchers are located on one level;
in another embodiment, the rotor has a configuration with two or more levels, as in this configuration, the catchers are located one above the other, on two or more levels;
in another embodiment, each rotor level has an odd number of catchers;
in another embodiment, the catchers are made of ripstop nylon or polyester.

DESCRIPTION OF FIGURES

FIG. 1 shows a three-dimensional bottom view of a turbine with four catchers, located on one level.

IMPLEMENTATION EXAMPLES

FIG. 1 shows one variant of the turbine according to the present invention. The device consists of a vertical axis (1) that passes through two bearing rings (2), and on which a rotor (3) is located in the form of a flat horizontal disk. Four catchers (4) are suspended below the rotor (3), each of them being made of ripstop nylon in the form of a half-chamber, open on one side. The above edge of the opening of each half-chamber is immovably fixed to the rotor (3), and the side edges are clamped to one end of three flexible links (5) whose second end is attached to the rotor (3). All catchers (4) are positioned so that their openings are oriented in the same direction of rotation relative to the axis (1), namely clockwise direction. On the upper side of the rotor (3), above the opening of each catcher (4), there are three valves (6) with air intakes (7) directed under an angle of 75 degrees to the radius of the rotor passing through them. The valves (6) lead to the interior of the catchers (4).

During its operation, the wind enters the turbine from any direction (the direction it is indicated by arrows in the figure), thereby exerting pressure on all catchers (4). If the rotor (3) is viewed as a clock face and the wind comes from the "6 o'clock" direction, the one of the catchers (4) located closest to the "9 o'clock" position, captures the pressure in the interior of its half-chamber, causing it to expand and tightens its links (5), from where the pressure is transmitted to the rotor (3) and rotates it around axis (1). At the same time, the wind pressure on all other catchers (4) is lateral or opposite to their openings, and causes them vertically folding to a flat horizontal position—a shape with zero aerodynamic resistance. This vertical folding takes place relative to the areas of attaching the upper edges of the respective catchers (4) to the rotor (3), which are pivot points. In the induced rotation process of the rotor (3), each catcher (4) successively falls to the "9 o'clock" position and dissolves under the pressure of side of its opening and under the influence of its weight, then in the "12 o'clock" position shrinks under lateral pressure to a flat shape and remains in that position until moving to the "6 o'clock" position. At the same time, under the influence of the affected pressure of the wind, in the "12 o'clock" position, the catcher (4) is moved to the periphery of the rotor (3), in position "3 o'clock" turns to leeward and covers its links (5), and in "6 o'clock" position is moved to axis (1). Also, when approaching position "6 o'clock" the air intakes (7) begin to capture the wind before the corresponding catcher (4), still compressed, and feed it through their valves (6), thus accelerating the initial expansion of the catcher opening (4), and begin to inflate it immediately after moving to the "6 o'clock" position. Then the wind instantly gets direct access to the interior of the catcher (4), and causes its full dissolution, giving an additional rotary motion to the rotor (3), during the entire transition between the "6 o'clock" and "12 o'clock" positions. When approaching a position "12 o'clock" due to its position, the air intakes (7) stop supplying air to the corresponding catcher (4) before stopping the wind pressure through the opening of the same catcher (4), and remain in this state until approaching the "6 o'clock" position. Through all the time the rotor (3) exerts constant aerodynamic drag, balanced relative to axis (1), whose value is negligibly small. The process continues until the wind stops.

Application of the Invention

The device can be applied to capture the mechanical pressure and extract the energy from fluid flows. Because its catchers are made of flexible and light material, it is characterized by a simple structure, light weight, and easy production and repair. Also, the device has a large working area, and reduces to a negligibly small value the aerodynamic resistance in the reversible half revolution of the rotor, which further increases its efficiency.

LIST OF DESIGNATIONS

1 Vertical axis
2 Bearing rings
3 Rotor
4 Catchers
5 Flexible connections
6 Valves
7 Air intakes

The invention claimed is:

1. A fluid turbine having a vertical axis, a rotor and parachute catchers, comprising:
   (a) the vertical axis 1, located in one or several bearing rings 2, and the rotor 3 in the form of a flat horizontal disk, fixed to an upper end of the axis 1;
   (b) one or more pairs of the catchers 4 are suspended below the rotor 3, such as the catchers 4 of each pair are centrally symmetrical to each other relative to the axis 1;
   (c) each of the catchers 4 is made of flexible material and in a passive position has a half-chamber shape that has an opening on one side; the opening of each of the catchers 4 has a top edge and a side edge;
   (d) an upper edge of the opening of each of the half-chamber shapes is immovably fixed to the rotor 3, and the side edge of the opening of each of the half-chamber shapes is clamped to the rotor 3 by two or more flexible links 5, a first end of each of the flexible links 5 being attached to the side edge of the catcher 4 opening, and a second end of each of the flexible links 5 is attached to the rotor 3;
   (e) the openings of all of the catchers 4 are oriented in a same direction of rotation relative to the axis 1—either clockwise or counterclockwise;
   (f) on an upper side of the rotor 3, above the opening of each of the catchers 4, are located one or more valves 6 with air intakes 7 directed at an angle greater than 45 degrees, relative to a radius of the rotor 3 passing through the valves; and
   (g) the valves 6 are in their open position and are directed to an interior of the catchers 4.

2. The fluid turbine according to claim 1, wherein each of the catchers 4 is located on one level.

3. The fluid turbine according to claim 1, wherein each rotor 3 level has an even number of catchers 4.

4. The fluid turbine according to claim 1, wherein each of the catchers 4 is made of ripstop nylon or polyester.

5. The fluid turbine according to claim 1, wherein one or more pairs of the catchers 4 comprises diametrical pairs.

* * * * *